US005309189A

United States Patent [19]

Marks et al.

[11] Patent Number: 5,309,189

[45] Date of Patent: May 3, 1994

[54] METHOD FOR SCREENING LINE SCREEN SLIT MASK COLOR PICTURE TUBES

[75] Inventors: Bruce G. Marks, Lancaster; Andrew Good, Reamstown; Frank R. Ragland, Jr., Lancaster; Richard C. Bauder, Millersville, all of Pa.

[73] Assignee: Thomson Consumer Electronics, Inc., Indianapolis, Ind.

[21] Appl. No.: 929,223

[22] Filed: Aug. 14, 1992

[51] Int. Cl.[5] ........................ G03B 41/00; G03C 5/00

[52] U.S. Cl. ........................................... 354/1; 430/24

[58] Field of Search ........................ 354/1; 430/24, 26

[56] References Cited

U.S. PATENT DOCUMENTS

| | | | |
|---|---|---|---|
| 4,049,451 | 9/1977 | Law | 96/36.1 |
| 4,099,848 | 7/1978 | Osakabe | 350/189 |
| 4,111,694 | 9/1978 | Duistermaat et al. | 96/36.1 |
| 4,226,513 | 10/1980 | Shimoma et al. | 354/1 |
| 4,516,841 | 5/1985 | Ragland, Jr. | 354/1 |
| 4,568,162 | 2/1986 | Ragland, Jr. | 354/1 |
| 4,586,799 | 5/1986 | Hayashi et al. | 354/1 |
| 4,634,247 | 1/1987 | Morrell et al. | 354/1 |

*Primary Examiner*—Michael L. Gellner

*Assistant Examiner*—Eddie C. Lee

*Attorney, Agent, or Firm*—Joseph S. Tripoli; Dennis H. Irlbeck

[57] ABSTRACT

The present invention is an improvement in a method of screening a line screen slit mask color picture tube that includes coating a faceplate panel of the tube with a photosensitive material, inserting a slit shadow mask into the panel and exposing the photosensitive material by passing light from a line light source through a misregister correction lens and through the slits of the mask. The improvement comprises positioning a skew correction lens between the line light source and the misregister correction lens during exposure of the photosensitive material. The skew correction lens has a surface with a general overall cylindrical shape with deviations from the cylindrical shape being in the four corners of the skew correction lens.

8 Claims, 3 Drawing Sheets

METHOD FOR SCREENING LINE SCREEN SLIT MASK COLOR PICTURE TUBES

This invention relates to a method of screening a color picture tube line screen by a photographic technique that uses a slit shadow mask of the tube as a photomaster, and particularly to an improvement in such method wherein skewing of a line light source image projected through the shadow mask onto the tube faceplate, during screening, is corrected by use of a novel skew correction lens.

BACKGROUND OF THE INVENTION

Most color picture tubes presently being manufactured are of the line screen slit mask type. These tubes have contoured rectangular faceplates with line screens of cathodoluminescent materials thereon and somewhat similarly contoured slit-apertured shadow masks adjacent to the screens. The mask slits are aligned in vertical columns, with each column containing a plurality of slits that are vertically separated by bridge or web portions of the mask.

Such line screen slit mask tubes are screened by a photographic method that utilizes a line light source, such as disclosed in U.S. Pat. No. 4,049,451, issued to H. B. Law on Sep. 20, 1977. The use of a line light source to form continuous phosphor lines, however, has an inherent geometric problem that must be solved. Because of the substantial curvatures of the shadow mask and tube faceplate, the images of the line light source that pass through the apertures off the major and minor axes of the mask are angled or skewed relative to the intended straight lines. If uncorrected, such skewing of the line light source images results in the formation of phosphor lines that are relatively ragged.

There have been several techniques suggested for solving the light source image skew problem. One solution is disclosed in U.S. Pat. No. 4,516,841, issued to Ragland on May 14, 1985. That patent teaches the use of a cylindrical-shaped lens located near a line light source during exposure of photosensitive material on the faceplate. The longitudinal axis of the cylindrical lens is oriented perpendicular to the longitudinal axis of the line light source. Because of the presence of the lens, the images of the line light source, projected through the slits of the mask onto the photosensitive material at locations off the major and minor axes of the panel, are rotated toward parallelism with the minor axis, thereby resulting in exposure of smoother lines on the photosensitive material.

In a modern color picture tube, the screen edges are perfectly rectangular and the phosphor lines are essentially vertical, depending on mask and panel contours. The cylindrical lens now in use to correct light source image skew has a constant radius across its width, producing an increasing skew correction for increases in distance from the major axis of the lens, which is parallel to the central longitudinal axis of the lens cylindrical shape. Since the skew angle of the line light source image and the skew correction angle provided by the lens vary by different amounts, the skew correction of the lens must be compromised by substantially balancing overcorrection in one area of the screen with undercorrection in another area of the screen. This compromise correction can produce a loss of color purity tolerance in a finished tube, because it results in the width of a phosphor line not being constant over the screen due to the remaining skew. Thus, in one example of a 27 V tube using a cylindrical skew correction lens with a 3.9 inch radius, a maximum skew angle of plus 3.5 degrees was noted at the top of the screen, between the minor axis and the corner, and a skew angle of minus 0.9 degree was noted at the corner. The skew angle of 3.5 degrees causes formation of wider phosphor lines, which results in a loss of tolerance of about 35 micrometers. Furthermore, a large skew angle also creates some amount of line necking which may be visible and thus objectionable in a finished tube. Therefore, there is a need to improve the design of skew correction lenses to reduce the amount of skew angle remaining during screening. The present invention meets this need.

SUMMARY OF THE INVENTION

The present invention is an improvement in a method of screening a line screen slit mask color picture tube that includes coating a faceplate panel of the tube with a photosensitive material, inserting a slit shadow mask into the panel and exposing the photosensitive material by passing light from a line light source through a misregister correction lens and through the slits of the mask. The improvement comprises positioning a skew correction lens between the line light source and the misregister correction lens during exposure of the photosensitive material. The skew correction lens has a surface with a general overall cylindrical shape with deviations from the cylindrical shape being in the four corners of the skew correction lens.

DETAILED DESCRIPTION OF THE PREFERRED EMBODIMENT

Figure 1:
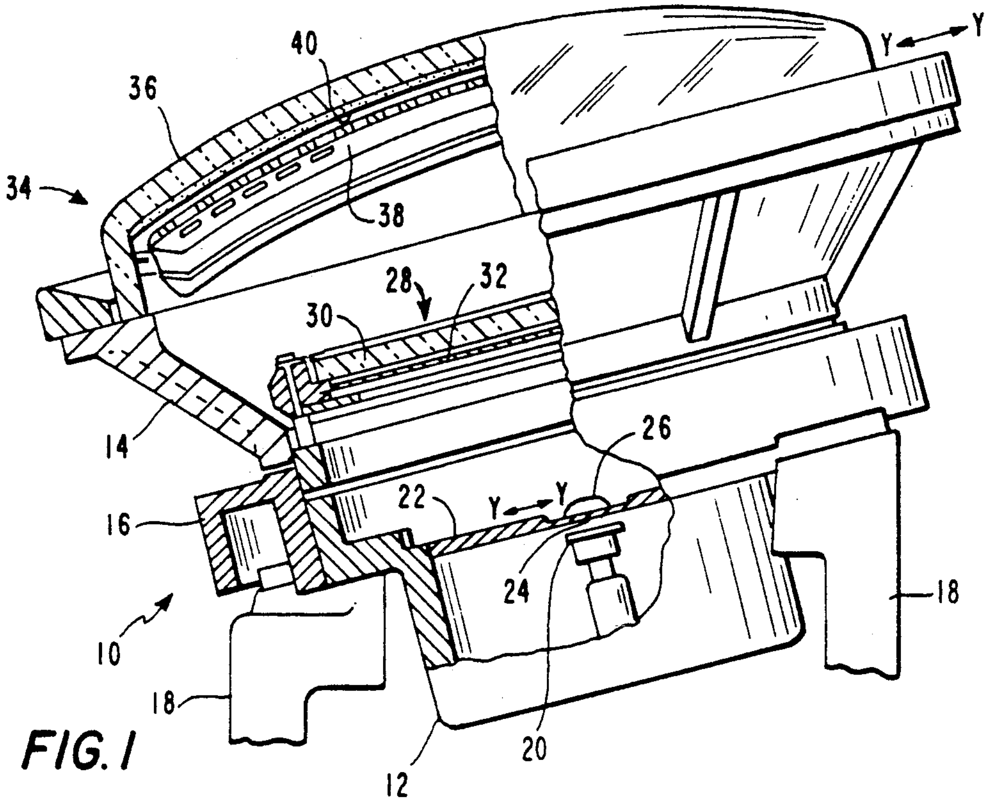
FIG. 1 is a plan view, partly in axial section, of a lighthouse exposure device used for screening color picture tubes.

FIG. 1 shows an exposure device, known as a lighthouse 10, which is used for screening a color picture tube. The lighthouse 10 comprises a light box 12 and panel support 14 held in position with respect to one another, by bolts (not shown), on a base 16 which is supported at a desired angle by legs 18. A line light source 20 (typically a mercury arc lamp) is supported within the light box 12. An apertured plate 22 is positioned within the light box 12, above the line light source 20. An aperture 24 within the plate 22 defines the effective length of the line light source 20 that is used during exposure. Just above the aperture 24 is a novel skew correction lens 26, which is described in greater detail below. A main correction lens assembly 28 is located within the panel support 14. The lens assembly 28 comprises a misregister correction lens 30, which refracts the light from the light source into paths taken by the electron beams during tube operation, and a light intensity correction filter 32, which compensates for the variations in light intensity in various parts of the lighthouse. A faceplate panel assembly 34 is mounted on the panel support 14. The panel assembly 34 includes a faceplate panel 36 and a slit shadow mask 38 mounted within the panel 36 by known means. The inside surface of the faceplate panel 36 is coated with a photosensitive material 40. During screening, the photosensitive material 40 is exposed by light from the line light source 20, after it passes through the apertured plate 22, the skew correction lens 26, the filter 32, the lens 30 and the shadow mask 38.

Figure 2:
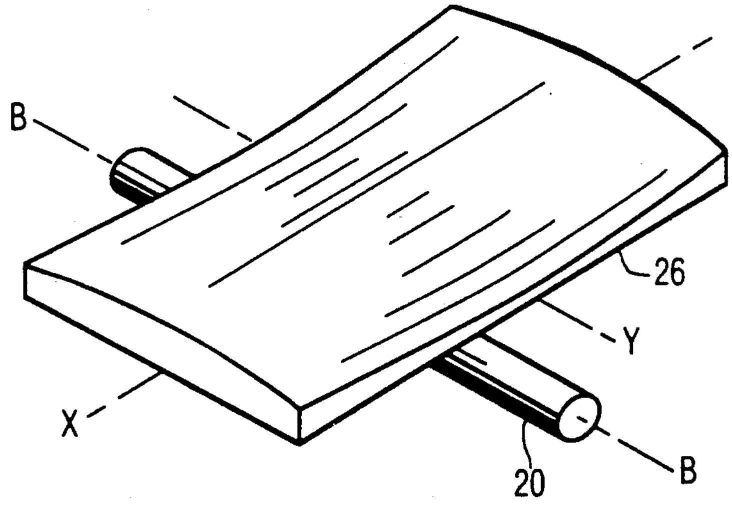
FIG. 2 is a perspective view of a skew correction lens and a line light source.
Figure 3:
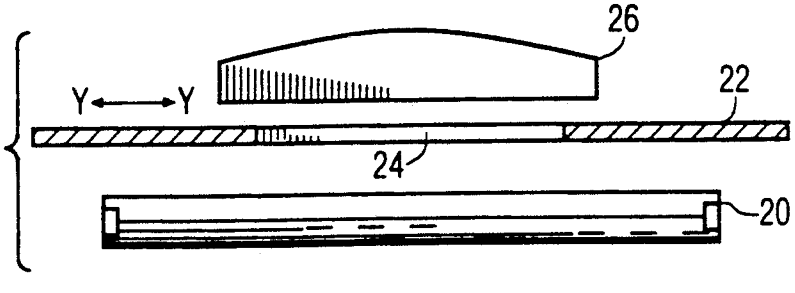
FIG. 3 is a partially sectioned side view of the lens and light source of FIG. 2, with an apertured plate therebetween.

FIGS. 2 and 3 show the line light source 20 and skew correction lens 26 in greater detail. The lens 26 is generally acylindrically shaped, being a solid piece of optical quartz that has a contoured convex surface and a flat surface. The lens 26 has orthogonal X and Y axes. The contoured convex surface of the lens 26 is defined by the polynomial, $$Z=A_1Y^2+A_2X^2Y^2,$$

where

- Z is the sagittal drop from plane tangent to the highest point on the lens, the plane being parallel to another plane containing the X and Y axes;
- $A_1$ is a negative coefficient that determines the magnitude of the sagittal variations for $Y^2$ changes;
- $A_2$ is a positive coefficient that determines the magnitude of the sagittal variations for $X^2$ $Y^2$ changes;
- X is the perpendicular distance from the Y axis; and
- Y is the perpendicular distance from the X axis.

The line light source 20 is tubular in shape and may be of the mercury arc type, such as the BH6 lamp manufactured by General Electric. Within the lighthouse 10, the lens 26 is oriented with its X axis perpendicular to the longitudinal axis B—B of the line light source 20. As shown in FIG. 3, the apertured plate 22 is positioned between the light source 20 and the skew correction lens 26. Although it is possible to place the lens 26 against the plate 22, directly on the aperture 24, it is preferable to space the lens 26 slightly above the aperture 24.

Figure 4:
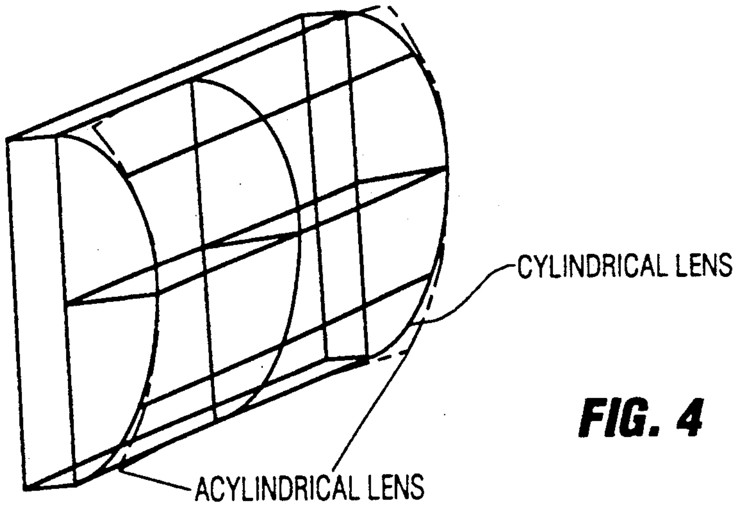
FIG. 4 is a perspective line view comparing a novel acylindrical lens and a prior art cylindrical lens.

FIG. 4 presents a comparison between a prior art cylindrical lens, shown in solid lines, and an acylindrical lens constructed in accordance with the present invention, shown in dashed lines. The central portion of the acylindrical lens is similar to the central portion of the cylindrical lens. However, the corner areas of the acylindrical lens have less sagittal drop than do the corners of the cylindrical lens, thus giving the appearance of slightly turned up corners. The acylindrical lens 26 has a greater radius of curvature at the sides of the lens that parallel the Y axis than at the Y axis.

During screening, both the faceplate panel 36 and the acylindrical skew correction lens 26 are moved in synchronization, in a direction Y—Y which is parallel to the longitudinal axis B—B of the line light source 20. Movement of the faceplate panel 36 alone causes the image of the line light source 20 impinging thereon to move sideways slightly at the corners of the panel. This slight movement is substantially eliminated by moving the cylindrical lens 26 in synchronization with the movement of the panel 36.

Figure 5:
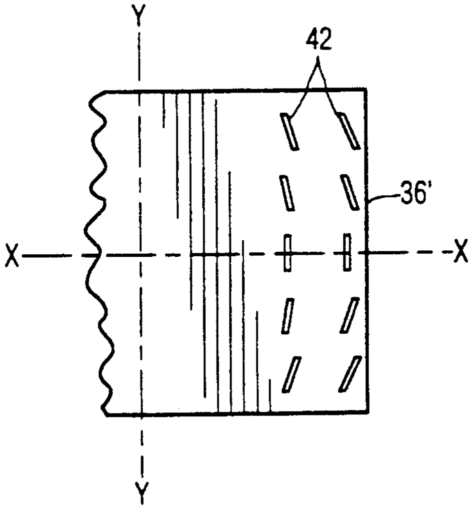
FIG. 5 is a plan view of a faceplate panel showing selected line light source images projected thereon, wherein the present invention is not used.
Figure 6:
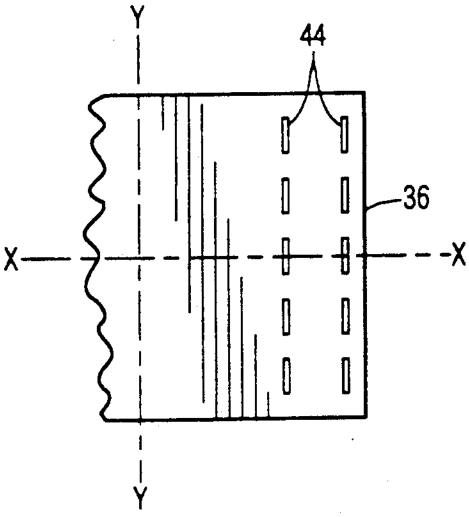
FIG. 6 is a plan view of a faceplate panel showing selected line light source images projected thereon, wherein the present invention is used.

The skew correction provided by the novel acylindrical lens 26 can be seen by comparing FIGS. 5 and 6. FIG. 5 shows the images 42 of a line light source cast on a faceplate panel 36', wherein no skew correction lens is used. In this figure, the images off the major axis X—X and the minor axis Y—Y are tilted at varying angles depending on their distances from both axes. For purposes of illustration, the image sizes and angles of tilt are greatly exaggerated in this drawing. FIG. 6 shows the resultant pattern formed by the light source images which are skew-corrected by the novel skew correction lens 26. As can be seen, smooth straight screen lines are formed by the line light source images 44.

GENERAL CONSIDERATIONS

The coefficients $A_1$ and $A_2$ in the equation, $Z=A_1Y^2+A_2X^2Y^2$, will be different for each tube type and are determined as follows. First, the light rays are traced from the ends of the line light source, through a misregister correction lens and through a plurality of pinholes in the mask, onto the screen. This step can be done manually, but preferably is done with a computer program. The result of this tracing is the deviation of the line light source image from the vertical, which is called skew. Next, a series of cylindrical lenses having different radii are inserted between the light source and the misregister correction lens, and the light ray tracings are repeated for each of the lenses. From these tracings, the best cylindrical lens for minimum skew at the Y axis is selected, and the best cylindrical lens for minimum skew at the sides of the lens paralleling the Y axis is selected. In the calculations made thus far, it has been found that the radius of curvature at the Y axis is less than the radius of curvature at the sides of the lens. The Y axis radius of curvature and the radius of curvature of the sides are then used as the starting criteria for an acylindrical lens. Next, the sagittal drops are calculated along the Y axis and along the sides, for the acylindrical lens. Then, a top side radius is connected from the end of the Y axis to the corner of the lens. Thereafter, curved lines, parallel to the Y axis, are connected from the X axis perpendicularly to points on the top side radius. The X axis of the acylindrical lens is held flat. The different radii of the curved lines are then evaluated at discrete points, to obtain the sagittal drops at these points. Finally, all of the sagittal drop values are fitted with a least squares bivariant fitting, from which the equation coefficients are determined.

It is preferred that the skew correction lens used in the present method be an ultraviolet UV grade quartz selected for its solarization resistance. Transmission of the lens should exceed 90% after a 100 hour exposure to a 1 KW mercury arc lamp positioned 10 mm from one side of the lens. Furthermore, the X and Y components of the slopes of the generally cylindrical surface of the skew correction lens should not deviate more than ±0.5 milliradian from the specified values. The planar surface of each lens should be flat to within 5 uniform fringes, using a helium source. Both surfaces of each lens should be finished to an optical polish and clarity with no observable haze.

The following table gives dimensions for a specific acylindrical skew correction lens of design similar to that of the lens 26 of FIGS. 2 and 3. The quality zone mentioned in the table is the effective area of the lens which is utilized during screening.

TABLE

| | |
|---|---|
| Overall Length (along X axis) | 63.5 mm (2.50 in.) |
| Overall Width (along Y axis) | 61.0 mm (2.40 in.) |
| Length of quality zone | 31.8 mm (1.25 in.) |
| Width of quality zone | 30.5 mm (1.20 in.) |
| Distance from light source center-line to lens plano-surface | 12.7 mm (0.50 in.) |
| $A_1$ coefficient | −0.3421 |
| $A_2$ coefficient | +0.1742 |

The excursion distance for the syncronized movement of the faceplate panel 36 and the lens 26 during exposure is dependent on the vertical dimensions of the mask webs or tie bars that separate each aperture within an aperture column. In some instances, the excursion distance of the lens will be different than the excursion distance for the panel. However, for one tube having a 66 cm (26 V) diagonal, an excursion distance of ±5.53 mm (0.211 in.) was found to be near optimum for both the panel and lens.

Figure 7:
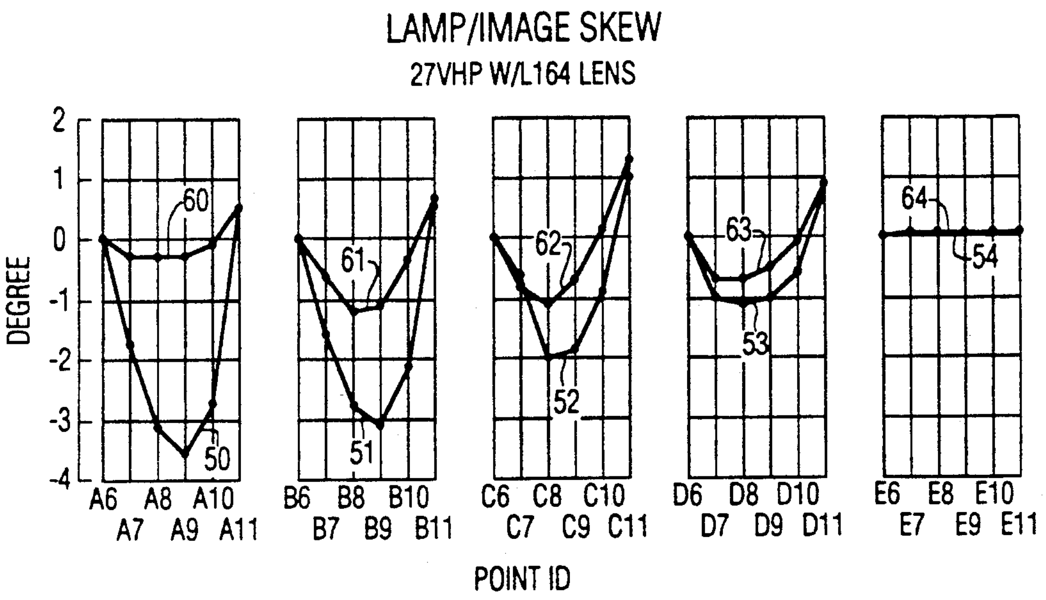
FIG. 7 is a graph of the degrees of line light source image skew at various locations on a faceplate, using a prior art cylindrical lens and a novel acylindrical lens.
Figure 8:
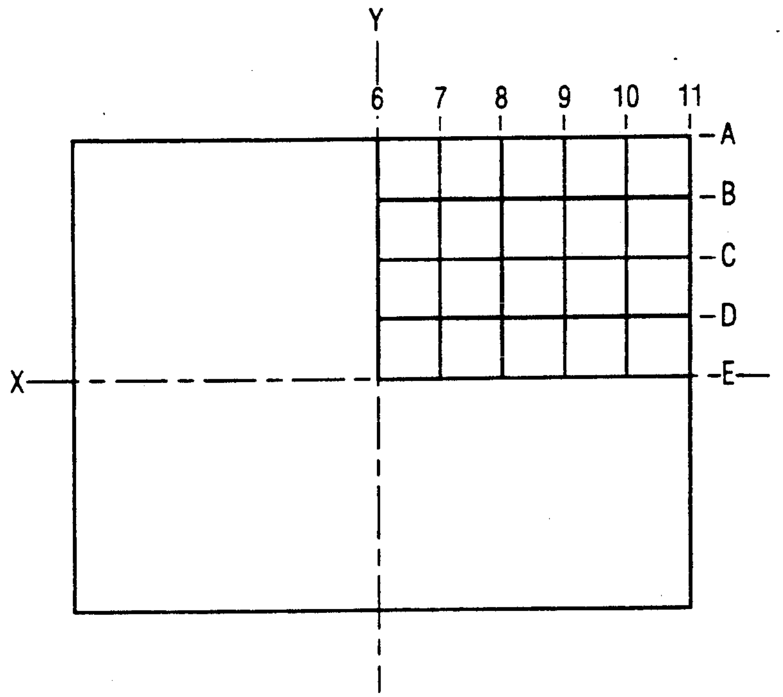
FIG. 8 is a faceplate showing the locations of the various data points used for the graph of FIG. 7.

FIG. 7 is a graph of the degree of light source image skew at various points on a screen for a tube screened with a prior art cylindrical lens (lines 50 to 54), and for a tube screened with the novel acylindrical lens of the present invention (lines 60 to 64). FIG. 8 shows the locations on a screen of the data points used in FIG. 7. It can be seen that, at the top of the screen, line A, the acylindrical lens was able to reduce the line light source image skew from −3.5 degrees to −0.3 degree. The corresponding reductions were: on line B, from −3.1 degrees to −1.2 degree; on line C, −2.0 degrees to −1.1 degree; and on line D, from −1.1 degree to −0.75 degree.

What is claimed is:

1. In a method of screening a line screen slit mask color picture tube including coating a rectangular faceplate panel of said tube with a photosensitive material, inserting a slit shadow mask into said panel and exposing said photosensitive material by passing light from a line light source through a misregister correction lens and through the slits of said mask, the improvement comprising positioning a skew correction lens between said line light source and said misregister correction lens during exposure of said photosensitive material, said skew correction lens being rectangular in shape and having a contoured convex surface and a flat surface, said convex surface having a cylindrical shape with deviations from the cylindrical shape being in the four corners of said rectangular skew correction lens.

2. In a method of screening a line screen slit mask color picture tube including coating a faceplate panel of said tube with a photosensitive material, inserting a slit shadow mask into said panel and exposing said photosensitive material by passing light from a line light source through a misregister correction lens and through the slits of said mask, the improvement comprising positioning a skew correction lens between said line light source and said misregister correction lens during exposure of said photosensitive material, said skew correction lens being rectangular in shape having two long sides, two short sides and four corners and having orthogonal X and Y axes, with said short sides paralleling said Y axis and said long side paralleling said X axis, said X axis of said skew correction lens being oriented substantially perpendicular to the longitudinal axis of said line light source, said skew correction lens having a surface with a general overall cylindrical shape with deviations from the cylindrical shape being in the four corners of said skew correction lens, and said general overall cylindrical shape having a central longitudinal axis paralleling said X axis.

3. In a method of screening a line screen slit mask color picture tube including coating a faceplate panel of said tube with a photosensitive material, inserting a slit shadow mask into said panel and exposing said photosensitive material by passing light from a line light source through a misregister correction lens and through the slits of said mask, the improvement comprising positioning a skew correction lens between said line light source and said misregister correction lens during exposure of said photosensitive material, said skew correction lens being rectangular in shape having two long sides and two short sides and having orthogonal X and Y axes, with said short sides paralleling said Y axis and said long side paralleling said X axis, said X axis of said skew correction lens being oriented substantially perpendicular to the longitudinal axis of said line light source, said skew correction lens having a surface with a greater radius of curvature along said short sides than at the Y axis.

4. In a method of screening a line screen slit mask color picture tube including coating a faceplate panel of said tube with a photosensitive material, inserting a slit shadow mask into said panel and exposing said photosensitive material by passing light from a line light source through a misregister correction lens and through the slits of said mask, the improvement comprising positioning a skew correction lens between said line light source and said misregister correction lens during exposure of said photosensitive material, said skew correction lens being rectangular in shape having two long sides, two short sides and four corners and having orthogonal X and Y axes, with said short sides paralleling said Y axis and said long side paralleling said X axis, said X axis of said skew correction lens being oriented substantially perpendicular to the longitudinal axis of said line light source, said skew correction lens having a first planar surface and a second curved surface having a general overall cylindrical shape with deviations from the cylindrical shape being an increased thickness in the four corners of said skew correction lens, and said general overall cylindrical shape having a central longitudinal axis paralleling said X axis.

5. In a method of screening a line screen slit mask color picture tube including coating a faceplate panel of said tube with a photosensitive material, inserting a slit shadow mask into said panel and exposing said photosensitive material by passing light from a line light source through the slits of said mask, the improvement comprising positioning an acylindrical lens between said line light source and faceplate panel during exposure of said photosensitive material, said lens having orthogonal X and Y axes, the X axis of said lens being oriented substantially perpendicular to the longitudinal axis of said line light source, said acylindrical lens having a surface defined by a polynomial that is a function of distance from said X axis squared, $Y^2$, and distance from said Y axis squared, $X^2$, times the distance from said X axis squared, $Y^2$.

6. In a method of screening a line screen slit mask color picture tube including coating a faceplate panel of said tube with a photosensitive material, inserting a slit shadow mask into said panel and exposing said photosensitive material by passing light from a line light source through a misregister correction lens and through the slits of said mask, the improvement comprising positioning an acylindrical lens between said line light source and said misregister correction lens during exposure of said photosensitive material, said lens having orthogonal X and Y axes, the X axis of said lens being oriented substantially perpendicular to the longitudinal axis of said line light source, said acylindrical lens having a surface defined by a polynomial that is a function of distance from said X axis squared, $Y^2$, and distance from said Y axis squared, $X^2$, times the distance from said X axis squared, $Y^2$.

7. In a method of screening a line screen slit mask color picture tube including coating a faceplate panel of said tube with a photosensitive material, inserting a slit shadow mask into said panel and exposing said photosensitive material by passing light from a line light source through a misregister correction lens and through the slits of said mask, the improvement comprising positioning an acylindrical lens between said line light source and said misregister correction lens during exposure of said photosensitive material, said lens having orthogonal X and Y axes, the X axis of said lens being oriented substantially perpendicular to the longitudinal axis of said line light source, said acylindrical lens having a first radius of curvature along said Y axis, and a second radius of curvature at the sides of the lens that parallel said Y axis said second radius of curvature being greater than said first radius of curvature.

8. In a method of screening a line screen slit mask color picture tube including coating a faceplate panel of said tube with a photosensitive material, inserting a slit shadow mask into said panel and exposing said photosensitive material by passing light from a line light source through the slits of said mask, the improvement comprising positioning an acylindrical lens between said line light source and said faceplate panel during exposure of said photosensitive material, said lens having orthogonal X and Y axes, the X axis of said lens being oriented substantially perpendicular to the longitudinal axis of said line light source, said acylindrical lens having a surface defined by the polynomial, $$Z=A_1Y^2+A_2X^2Y^2,$$

where

Z is the sagittal drop from plane tangent to the highest point on the lens, the plane being parallel to another plane containing the X and Y axes;

$A_1$ is a negative coefficient that determines the magnitude of the sagittal variations for $Y^2$ changes;

$A_2$ is a positive coefficient that determines the magnitude of the sagittal variations for $X^2 Y^2$ changes;

X is the perpendicular distance from the Y axis; and

Y is the perpendicular distance from the X axis.

* * * * *